United States Patent [19]

Okada

[11] Patent Number: 5,515,104
[45] Date of Patent: May 7, 1996

[54] CAMERA HAVING COLOR CORRECTION COEFFICIENTS SET IN ACCORDANCE WITH A COMBINATION OF PHOTOGRAPHIC PARAMETERS

[75] Inventor: Setsuo Okada, Hokkaido, Japan

[73] Assignee: Hudson Soft Co. Ltd., Hokkaido, Japan

[21] Appl. No.: 161,296

[22] Filed: Dec. 2, 1993

[30] Foreign Application Priority Data

Sep. 28, 1993 [JP] Japan ................................. 5-264193

[51] Int. Cl.⁶ ............................................ H04N 5/225
[52] U.S. Cl. .................... 348/334; 358/909.1; 354/219; 348/333
[58] Field of Search ............................ 348/64, 333, 334; 358/527, 909.1; 354/219; H04N 5/225

[56] References Cited

U.S. PATENT DOCUMENTS

| | | | |
|---|---|---|---|
| 4,262,301 | 4/1981 | Erlichman | 358/527 X |
| 4,714,962 | 12/1987 | Levine | 358/527 X |
| 4,812,879 | 3/1989 | Suzuki | 358/527 |
| 4,841,359 | 6/1989 | Hawkins et al. | 358/527 X |
| 4,868,642 | 9/1989 | Kaneko | 358/527 |
| 4,893,178 | 1/1990 | Matama et al. | 358/527 |
| 4,939,581 | 7/1990 | Shalit | 348/333 |
| 4,949,117 | 8/1990 | Van Heyningen et al. | 348/64 X |
| 4,958,220 | 9/1990 | Alessi et al. | 358/527 |
| 5,027,196 | 6/1991 | Ono et al. | 358/527 |
| 5,164,833 | 11/1992 | Aoki | 348/333 |

FOREIGN PATENT DOCUMENTS

| | | |
|---|---|---|
| 62-222231 | 9/1987 | Japan . |
| 5107594 | 4/1993 | Japan . |

*Primary Examiner*—James J. Groody
*Assistant Examiner*—Cheryl Cohen
*Attorney, Agent, or Firm*—Lowe, Price, LeBlanc & Becker

[57] ABSTRACT

A camera has a display for displaying a subject with colors which are determined in accordance with a color correction coefficient. The coefficient is generated in accordance with a combination of photographic parameters, such as a shutter speed, an aperture, etc.

8 Claims, 5 Drawing Sheets

FIG. 7

| APERTURE | SHUTTER SPEED | TYPE OF PHOTOSENSITIVE PAPER | R | G | B |
|---|---|---|---|---|---|
| f8 | 1/250 | 1 | R1 | G1 | B1 |
| | | 2 | R2 | G2 | B2 |
| | | 3 | R3 | G3 | B3 |
| | | 4 | R4 | G4 | B4 |
| | | 5 | R5 | G5 | B5 |

CAMERA HAVING COLOR CORRECTION COEFFICIENTS SET IN ACCORDANCE WITH A COMBINATION OF PHOTOGRAPHIC PARAMETERS

BACKGROUND OF THE INVENTION

This invention relates to a camera that is provided with an improved monitor device for monitoring a subject to be photographed.

A subject to be photographed is looked or viewed through a viewfinder of a camera, so that a required picture may be taken on photographic film by adjusting a photographing condition.

When a shutter, which is arranged behind a lens, is opened for a predetermined time, light from the subject image is formed on the film. The shutter speed and aperture are adjusted based on the weather, types of the film and sensitive paper and the like to take the picture well.

According to a conventional camera, the image looked through the viewfinder and the image taken on the photosensitive paper can be different in color from each other. A color is defined by the brightness and chroma.

SUMMARY OF THE INVENTION

Accordingly, it is an object of the invention to provide a camera having a monitor device for monitoring a subject to be taken a picture with colors which are identical to those of a printed image.

According to the invention, a camera has a display device for displaying a subject with colors which are determined in accordance with a color correction coefficient. The coefficient is generated in accordance with photographic parameters, such as a shutter speed, an aperture, etc.

BRIEF DESCRIPTION OF THE DRAWINGS

FIG. 7 is a table showing color correction coefficients stored in a ROM of the camera shown in FIG. 1.

DETAILED DESCRIPTION OF THE INVENTION

A camera with a monitor device according to the invention is now explained in conjunction with the appended drawings.

Figure 1:
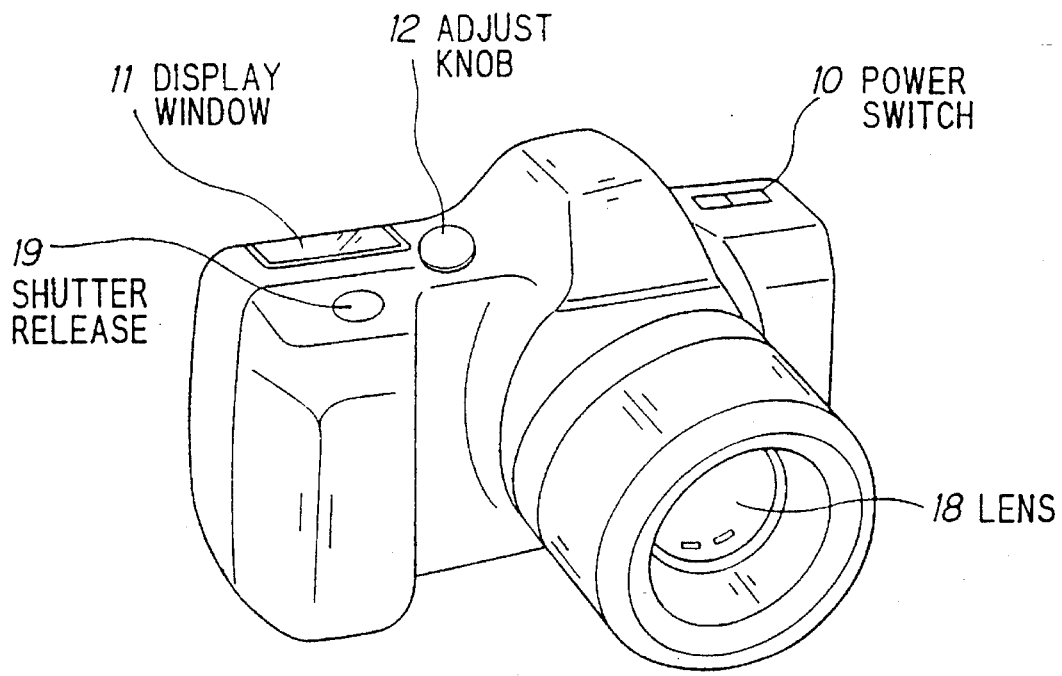
FIG. 1 is a perspective view showing a camera according to the invention.
Figure 2:
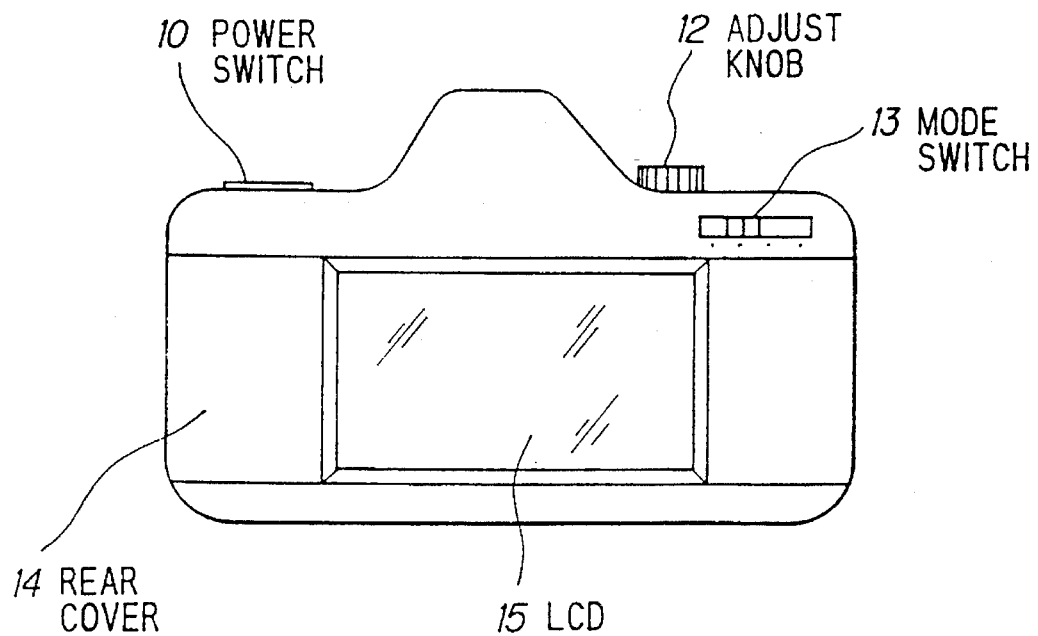
FIG. 2 is a rear view of the camera shown in FIG. 1.

FIGS. 1 and 2 show the camera, which includes a power switch 10, a display window 11 for displaying a variety of information and warning, an adjust knob 12 for adjusting photographing parameters by turning, a mode switch 13 for changing a mode to be adjusted, a rear cover 14, an LCD (Liquid Crystal Display) 15 mounted on the rear cover 14, a lens 18 to which light is supplied from a subject, and a shutter release 19 used for driving a shutter.

Figure 3:
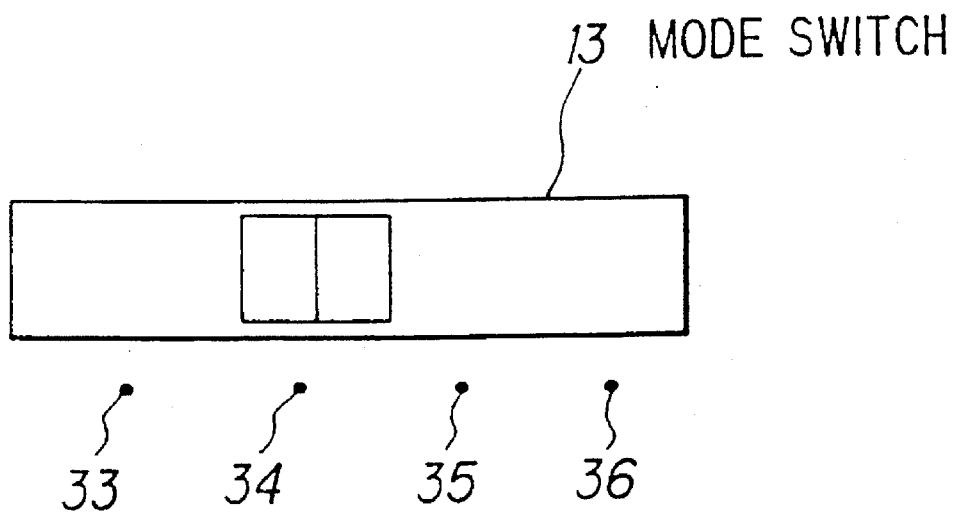
FIG. 3 is an expanded view showing a mode switch of the camera shown in FIG. 1.
Figure 4:
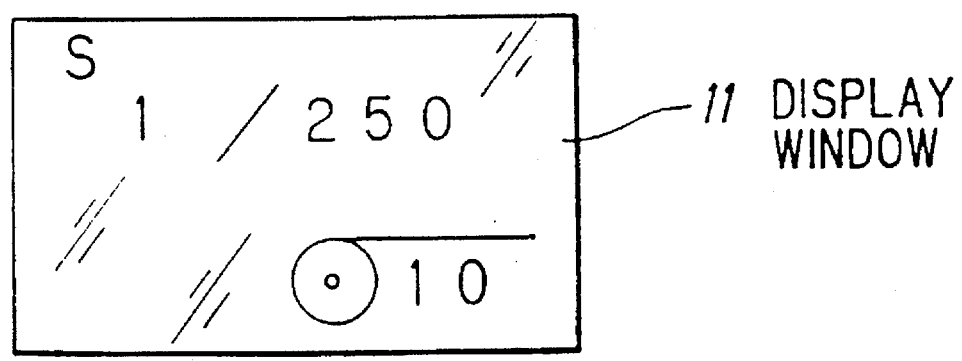
FIG. 4 is an expanded view showing a display window of the camera shown in FIG. 1.

FIG. 3 shows the mode switch 13, which is provided with mode input channels for aperture 33, including shutter speed 34, film ISO 35 and type of sensitive paper 36. When mode switch 13 is set at the shutter speed channel 34, the set shutter speed is displayed on the display window 11, as shown in FIG. 4, so that the shutter speed becomes to be adjustable by the adjust knob 12.

Figure 5:
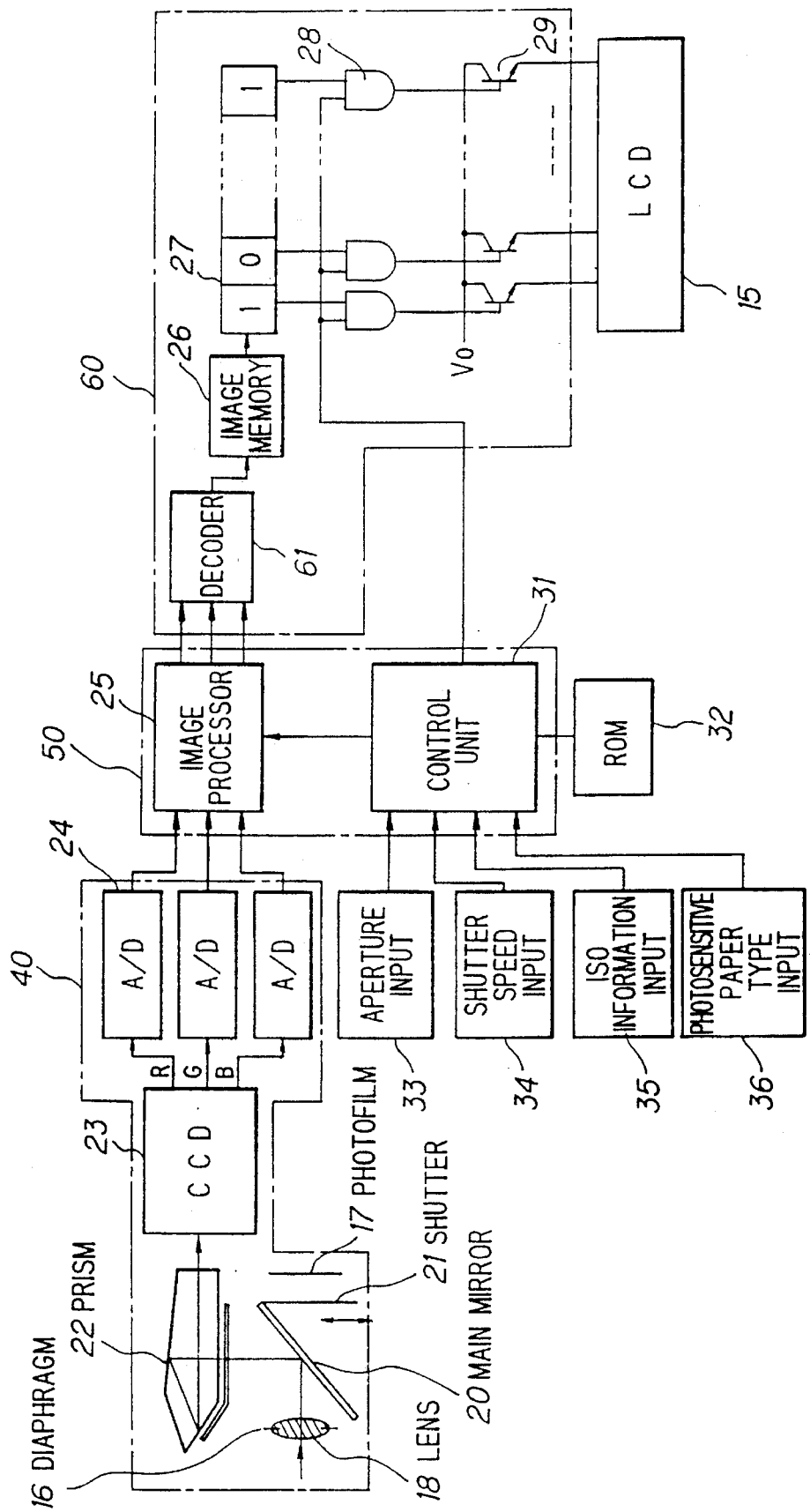
FIG. 5 is a block diagram showing a circuit structure of the camera shown in FIG. 1.
Figure 6:
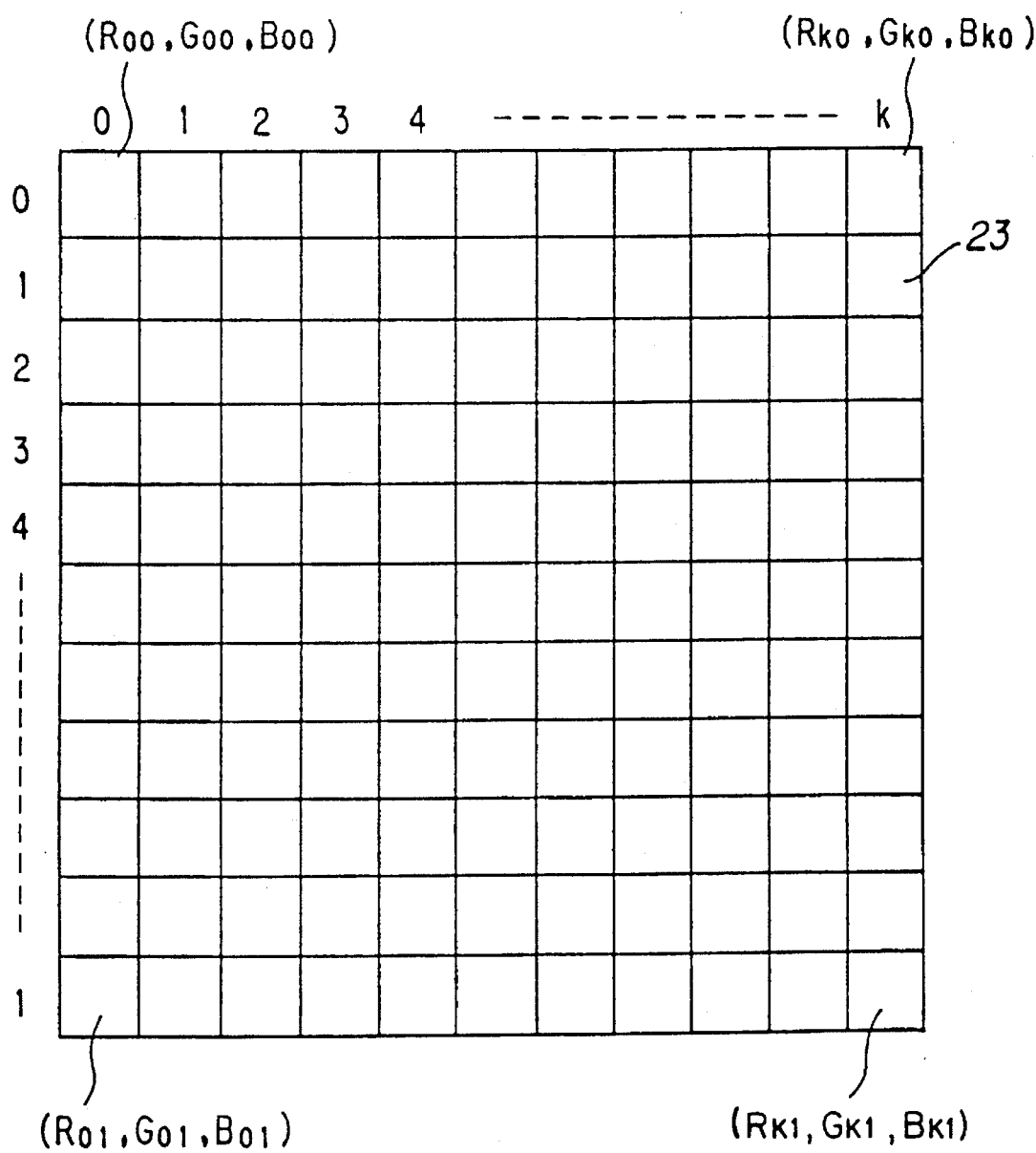
FIG. 6 is an explanatory diagram for a CCD used in the camera shown in FIG. 1.

FIG. 5 shows the circuitry structure of the camera, which includes an image signal generator 40, a ROM (Read Only Memory) 32, an arithmetic unit 50, and a display drive circuit 60.

The image signal generator 40 resolves light supplied from the subject to generate picture element signals of three primary colors, red, green and blue. The ROM 32 stores color correction coefficients for each primary color, which are given in accordance with photographic parameters, such as the aperture, shutter speed, sensitivity of the film (ISO) and type of the photosensitive paper. The arithmetic unit 50 corrects the picture element signals in accordance with one of the correction coefficient. The display drive circuit 60 drives the LCD 15 to display the subject in accordance with the corrected picture element signals.

The image signal generator 40 includes a lens 18 to which light is supplied from the subject, a diaphragm 16 for adjusting the aperture for the lens 18, a shutter 21 responsive to the operation of the shutter release 19 for shutting the light from the subject to a film 17, a main mirror 20 for reflecting light upward, a prism 22 for correcting an upset or inverted image to an upright image, a CCD 23 for converting the light supplied from the subject through a color filter (not shown) to the three primary picture element signals R, G and B, and an A/D converter 24 for converting the picture element signals (analog signals) to digital signals.

The CCD 23 produces picture element signals for whole screen, for example, l×k picture elements are produced to provide picture element signals indicated by $R_{00}$, $G_{00}$, $B_{00}$ to $R_{kt}$, $G_{kt}$, $B_{kt}$. Each picture element signal supplied from the corresponding picture element is defined by three bits of data corresponding to one of eight levels of color intensity.

FIG. 7 shows an example of color correction coefficients (R1 to R5, G1 to G5 and B1 to B5), which are defined by 3 bits, for each type of sensitive paper (#1 to #5) in the case where the film sensitivity, aperture and shutter speed are ISO-100, f8 and 1/250, respectively. The ROM 32 also stores the other combinations of color correction coefficients.

The arithmetic unit 50 includes an image processor 25 and a control unit 31. The image processor 25 corrects the digital picture element signals in accordance with a color correcting coefficient, which is given based on the photograph parameter, to produce a plurality of correcting picture element signals. The control unit 31 reads the color correction coefficient from the ROM 32 in accordance with the photographic parameters supplied from an aperture control unit 33, a shutter speed control unit 34, an ISO information input unit 35 and a sensitive paper type input unit 36. The correction coefficient is supplied to the image processor 25.

In the arithmetic circuit 50, for example, picture element signals $R_{00}$, $G_{00}$, $B_{00}$ are multiplied by R1, G1 and B1, respectively, to provide corrected picture element signals $R_{00} \times R1$, $G_{00} \times G1$ and $B_{00} \times B1$.

The display drive circuit 60 includes a decoder 61 for decoding correction picture element signals to image signals specified by eight levels, an image memory 26 for storing the image signals, a shift register 27 for holding the image signals serially, a gate circuit 28 responsive to an enable signal from the control unit 31 for providing a drive signal in accordance with the state (0 and 1) of the shift register 27, and a transistor 29 responsive to the drive signal from the gate circuit 28 for applying a voltage V to an electrode of the LCD 15.

The LCD 15 is provided with eight electrodes for each picture element so that each picture element may display one of eight various colors corresponding to the level of the image signal.

The operation of the camera according to the invention is now explained. First of all, the power switch 10 is turned on, then the mode switch 13 is turned to the ISO mode channel, and then, the sensitivity (ISO) of a film to be used is set by turning the adjust knob 12 while looking in the display window 11. Next, the mode switch 13 is turned to the photosensitive paper type channel, and then, the type (number) of photosensitive paper to be used is set by turning the adjust knob 12. Then, shutter speed and aperture, which are determined in accordance with the weather, the sensitivity of the film 17 and the type of the photosensitive paper, are set by using the display window 11 and adjust knob 12 in the same manner as the ISO of the film and type of photosensitive paper.

When all parameters are set, the control unit 31 reads a color correction coefficient corresponding to the parameters from the ROM 32, and supplies the coefficient to the image processing unit 25. For example, if the ISO, aperture, shutter speed, type of photosensitive paper are set at 100, f8, 1/250 and 3, respectively, color correction coefficients R3, G3 and B3 are obtained in accordance with the table shown in FIG. 7.

When light is supplied from the subject to the lens 18, whose aperture is being adjusted by the diaphragm 16, the light is reflected at the main mirror 20 to the prism 22, and as a result, an upright image is supplied to the CCD 23.

In response to the light, the CCD 23 supplies picture element signals of R, G and B to the A/D converter 24, and then, the signals are converted into digital signals to be supplied to the image processor 25.

The image processor 25 corrects the picture element signals in accordance with the color correction coefficients supplied from the control unit 31. If, for example, the color correction coefficients are R3, G3 and B3, the picture element signals $R_{00}$, $G_{00}$ and $B_{00}$ from the CCD 23 are corrected to $R_{00} \times R3$, $G_{00} \times G3$ and $B_{00} \times B3$. These corrected picture element signals are decoded by the decoder (not shown) to image signals specified by one of eight levels.

The image signal is stored in the image memory 26, and is supplied to the shift register 27 serially. At this time, the control unit 31 supplies the enable signal to the gate circuit 28 so that the drive signal is supplied from the gate circuit 28 in accordance with the state (0 and 1) for each bit of the shift register 27, whereby the transistor 29 applies the voltage V to the electrodes (not shown) of the LCD 15 to display color image of the subject. In the LCD 15, the color image may be displayed by eight colors for each picture element.

As described before, according to the invention, it is possible to recognize the difference between the viewed image and intended image, so that the photographic parameters can be readjusted in accordance with the displayed image on the LCD 15. Therefore, the intended image is obtained on the sensitive paper certainly.

In the above mentioned embodiment, the LCD is mounted on the rear cover as a display device; however, display device is not limited by the LCD, but a CRT may be placed separately from the camera body. In this case, the cameraman may be displayed by controlling the direction of the display device.

I claim:

1. A camera with a monitor device, comprising:

means for monitoring a subject to be taken a picture;

means for displaying the subject with colors which are determined in accordance with a color correction coefficient;

means for storing a combination of predetermined photographic parameters including aperture, shutter speed, sensitivity of film and type of photosensitive paper and corresponding color correction coefficients associated therewith; and means for retrieving the color correction coefficients in accordance with a combination of current photographic parameters currently set in the camera corresponding to the combination of the predetermined photographic parameters stored in said means for storing for taking the picture and for transmitting the color correction coefficients to said means for displaying to display a corrected image of the subject.

2. A camera with a monitor device and a mode switch, comprising:

an image processing unit for processing color image signals of a subject to provide a monitor image on the monitor device that is identical with an image that a camera lens projects upon a film, wherein the monitor image is generated by adjusting said color image signals according to color correction coefficients corresponding to a combination of photographic parameters including aperture, shutter speed, sensitivity of film and type of photosensitive paper input from the mode switch of the camera substantially eliminating the variable effect that the shutter speed, the aperture, the sensitivity of film and the type of photosensitive paper have on the color image signals; and a display means for displaying the identical color image.

3. A camera with a monitor device, comprising:

means for generating picture element signals of three primary colors by receiving reflection light from a subject;

means for storing color correction coefficients for the three primary colors in accordance with a combination of parameters including aperture, shutter speed, sensitivity of film and type of photosensitive paper;

means for obtaining in real-time a combination of current parameters including current aperture, current shutter speed, current sensitivity of film and current type of photosensitive paper;

calculation means for correcting the picture element signals in accordance with the correction coefficients corresponding to the combination of the parameters stored in said means for storing responsive to the combination of the current parameters obtained in real-time by said means for obtaining; and means for displaying the subject, which is produced in accordance with the corrected picture element signals.

4. A camera with a monitor device for displaying an image of a subject having colors and for printing the image on photo-sensitive paper, comprising:

an image signal generator for generating picture element signals R, G and B of said subject to be photographed by receiving light reflected from said subject;

an input unit for input of a combination of parameters for taking a photograph of the image, said input unit receiving the combination of the parameters including an aperture setting, a shutter speed, a film sensitivity, and a photosensitivity paper number from a mode switch of said camera manipulated by a camera operator;

a ROM for storing color correction coefficients $R_n$, $G_n$ and $B_n$ $n=1, 2, 3, \ldots$ ) depending on said combination of parameters;

an image processor for processing said picture element signals R, G and B to provide corrected picture element signals in accordance with said color correction coefficients $R_n$, $G_n$ and $B_n$ read from said ROM corresponding to the combination of the parameters; and a color image monitor for displaying a color image of said subject by receiving said corrected picture element signals.

5. A camera with a monitor device according to claim 4, wherein:

said image signal generator generates said picture element signals R, G and B, each of which includes plural bits to indicate one of plural color intensities for each of the colors;

said ROM stores said color correction coefficients $R_n$, $G_n$ and $B_n$, each of which includes said plural bits to indicate said one of plural color intensities for said each of the colors; and said color image monitor displays said color image having color picture elements each displayed by said one of plural color intensities using the corrected picture element signals.

6. A camera with a monitor device according to claim 4, wherein:

said image signal generator comprises a prism for providing an upright light image of said subject, thereby generating picture element signals R, G and B by converting said upright light image to electric signals.

7. A camera with a monitor device according to claim 4, wherein:

said image processor provides said corrected picture element signals by calculation of $R \times R_n$, $G \times G_n$ and $B \times B_n$.

8. A camera with a monitor device for displaying an image of a subject having colors and for printing the image on photosensitive paper, the camera comprising:

an image signal generator, receiving the image from light reflected from the subject, and converting the image into color picture element signals;

an input device inputting a combination of current camera settings for photographing the subject including a current aperture setting, a current shutter speed, a current film sensitivity, and a current photosensitivity paper number;

a memory storing predetermined color correction coefficients corresponding to a combination of predetermined camera settings including a predetermined aperture setting, a predetermined shutter speed, a predetermined film sensitivity, and a predetermined photosensitivity paper number; and an image processor connected to said signal image generator, to said input device and to said memory, and generating corrected picture element signals for display of a corrected image of the subject having the colors on the monitor, said image processor generating the corrected picture elements responsive to the color correction coefficients with the combination of the predetermined camera settings corresponding to the combination of the current camera settings used to photograph the subject substantially eliminating the variable effect that the shutter speed, the aperture, the sensitivity of film and the type of photosensitive paper have on the color picture element signals.

* * * * *